US006843158B2

(12) United States Patent
Garcia et al.

(10) Patent No.: US 6,843,158 B2
(45) Date of Patent: Jan. 18, 2005

(54) METHOD AND APPARATUS FOR DETECTING TARGET OBJECTS

(76) Inventors: Maurice M. Garcia, 13551 Rye St., Apt. #1, Sherman Oaks, CA (US) 91423; Rodolfo Garcia, 2500 Wilshire Blvd., Suite 742, Los Angeles, CA (US) 90057

(*) Notice: Subject to any disclaimer, the term of this patent is extended or adjusted under 35 U.S.C. 154(b) by 0 days.

(21) Appl. No.: 10/137,642

(22) Filed: May 2, 2002

(65) Prior Publication Data

US 2003/0126977 A1 Jul. 10, 2003

Related U.S. Application Data

(63) Continuation-in-part of application No. 09/585,654, filed on Jun. 1, 2000, now Pat. No. 6,382,070.

(51) Int. Cl.[7] .................................................. F41H 11/12
(52) U.S. Cl. ........................ 89/1.13; 102/403; 119/711; 119/712
(58) Field of Search ................................ 119/709, 710, 119/711, 712; 102/402; 89/1.13, 403

(56) References Cited

U.S. PATENT DOCUMENTS

| 2,086,631 A | * | 7/1937 | Munro |
| 3,860,404 A | * | 1/1975 | Jochimski .................... 131/238 |
| 5,061,300 A | * | 10/1991 | Alexander, III ................ 55/30 |
| 5,390,629 A | * | 2/1995 | Simone ....................... 119/711 |

FOREIGN PATENT DOCUMENTS

| GB | 2 263 613 A | * | 8/1993 |
| JP | 10-136826 | * | 5/1998 |

* cited by examiner

Primary Examiner—Stephen M. Johnson
(74) Attorney, Agent, or Firm—Colin P. Abrahams

(57) ABSTRACT

The present invention relates generally to a method and devices for the detection of target objects, such as landmines, using the odor characteristics which may be associated with the target objects as a way of detecting their presence. The invention includes devices used to carry out a method of training live animals, such as rats, to seek out the target objects in the field, or to localize, unearth, and mark the location thereof.

6 Claims, 3 Drawing Sheets

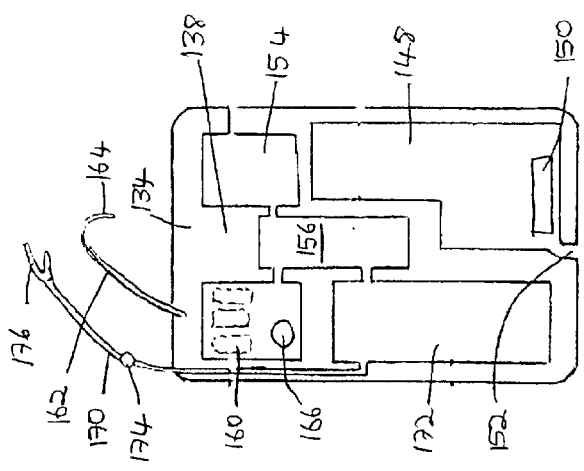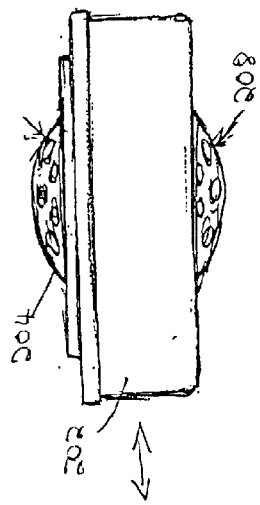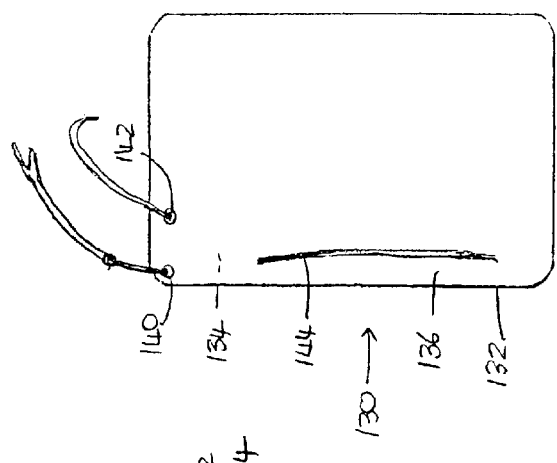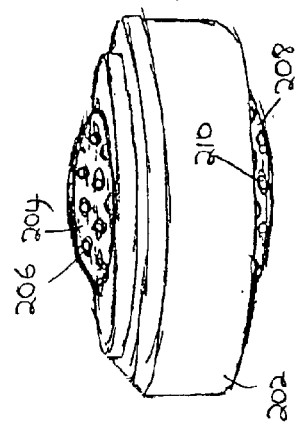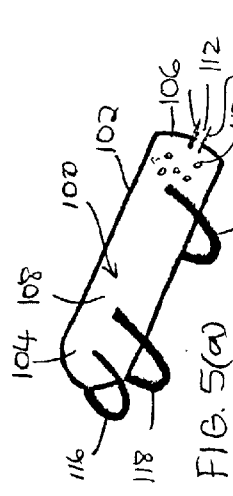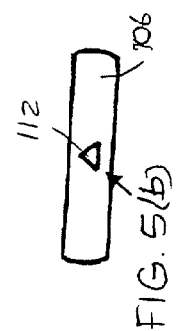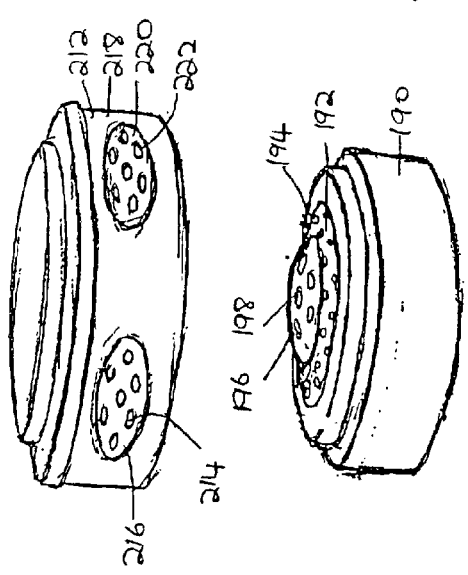

METHOD AND APPARATUS FOR DETECTING TARGET OBJECTS

CROSS REFERENCE TO RELATED APPLICATIONS

This application is a continuation-in-part application of U.S. patent application Ser. No. 09/585,654 filed Jun. 1, 2000, now U.S. Pat. No. 6,382,070, which is incorporated herein by reference in its entirety.

FIELD AND BACKGROUND OF THE INVENTION

The present invention relates generally to a method and devices for the detection of target objects such as landmines. More particularly, the present invention includes several devices used to carry out a method of training live animals, such as rats and birds, to seek out and destroy target objects such as active landmines in the field, or to localize, unearth, and mark the location of active mines, thereby reducing the danger of their later removal by valuable sniffing mine clearing animals, technology, and mine clearing personnel, making a landmine clearance effort more effective and efficient.

In many areas around the world, thousands of landmines which have not been removed from areas of previous or ongoing armed conflicts remain active and intact. Their presence poses a grave and constant threat to human inhabitants, particularly children. The loss of lives and livelihood as a consequence of these exploding landmines is unacceptably high, and the cost to meticulously clear these areas using conventional approaches is prohibitive. To make matters worse, the hilly and irregular terrain where many of these landmines are located makes the use of conventional bulldozers and other general methods used in their removal impractical and difficult.

Current methods of clearing or deactivating landmines can be generally divided into four categories. First, there is human-directed field detection, mostly employed in poor developing nations, whether by sophisticated hand held devices or through the use of highly dangerous methods of attempting to deactivate the landmines directly. Second, bomb or land mine-sniffing dogs may be trained to locate and trace vapors or odors of the landmine explosive materials which teak over time. Third, high-tech equipment and computers analyze collected air samples to detect explosive materials in the atmosphere, as well as sophisticated and expensive mapping methods; and, fourth, heavy, military motorized equipment or vehicles may be used. Unfortunately, with the exception of the most primitive methods of detecting landmines, which offer the greatest risk of loss in human life, all of these methods are extremely costly. Cost has been the overwhelming limiting factor to widespread efforts to clear active landmine fields in the world.

For instance, whereas dogs have proven to be highly effective detection agents, each dog can cost over $50,000 to train, and to continue to be effective in the face of changing mine modalities, each dog requires regular skills maintenance and additional training. Furthermore, other factors besides their high cost are equally discouraging. These include the following: (1) trained dogs are occasionally casualties themselves because over time a significant percentage of these animals die as casualties in the field; (2) the long-term use of trained dogs is not possible because although dogs can be well-trained based only on praise and affection from their human trainers and masters, these "reenforcers" prove to wane in strength over time, resulting in the inevitable increase in the level of risk to the training personnel; (3) the use of trained dogs depends heavily on the presence and interaction with a trained human de-miner which still imposes a great element of risk to human life; (4) the training is "task" specific because dogs only learn how to locate landmines, and once they have located them, training dogs to avoid detonating a landmine is extremely difficult, leading to frequent inadvertent detonation of mines by activation of booby-trap mechanisms; (5) as dogs are limited to only localizing mines, the two problems of unearthing and disposing of the localized mines remain; and (6) dogs only provide guidance and information as to the location of a landmine in a relatively large general area, ineffective for safe pin-point detection of landmines for human clearers.

High-tech or heavy equipment vehicles all are prohibitively expensive and hence unrealistic for most developing nations where the greatest number of active landmine fields are found.

Another problem with the methods and devices described above is poor accessibility to the active landmine field areas. Transporting mine-clearing specialists, dogs, high-tech and heavy equipment to remote areas, frequently characterized by irregular, rocky, inhospitable terrain, is a great obstacle in clearance efforts.

Most importantly, current methods and devices pose an extremely dangerous risk to landmine clearance personnel. The best of trained personnel, even with extensive education and sound judgment, are constantly subject to great risk because of the possibilities of error and missed detection. Even with the aid of a highly trained dog having extensive experience, human life is seriously at risk. Therefore, methods and devices used in clearing and disarming active landmines must maximize the protection of trained human specialists.

In order to address these safety concerns and be successful in effecting a substantially complete disablement of active landmines, an approach to the global landmine problem must satisfy a number of critical and essential factors. Such factors include: landmine design constraints; accessibility over difficult terrain and remote topography of landmines; detection difficulties due to low to zero metal content, small size, and camouflage properties; novel "booby trap" mechanisms; economically feasible disposal methods; dangers from ongoing regional conflicts imposed on human mine clearing personnel.

SUMMARY OF THE INVENTION

According to one aspect of the invention, there is provided a method for detecting the presence and location of a target object comprising the steps of training a live animal in a controlled environment to respond to certain characteristics associated with the target object; rewarding the animal when the characteristic associated with the target object has been sensed; and releasing the animal into an area to detect the presence of such target objects in said area by sensing said characteristics associated with the target object. The "reward" to the animal for having located the given target may be a substance to which it becomes addicted, and this addiction in turn reinforces both the animals drive to locate its target, as well as its developing expertise in doing so in an effective, efficient, discriminating manner. The reward is always associated with the presence of the target, and in this way, the target is equated with satisfying reward cravings in the animal.

According to another aspect of the invention, there is provided a receptacle for use in training an animal to detect the presence of a target object, the receptacle comprising: a housing defining a first chamber and a second chamber, wherein the first chamber in use receives a substance having a characteristic odor to be sensed by the animal and the second chamber in use receives a substance comprising a reward to the animal; at least one hole in the first chamber through which the odor of the substance therein may pass from the first chamber to the outside of the first chamber; and access means in the second chamber so that the animal can obtain at least a portion of the substance in the second chamber.

According to yet a further aspect of the invention, there is provided a carry pack for an animal used to detect the presence of a target object by sensing a characteristic odor associated with the target object, the carry pack comprising: a container housing defining a chamber, the container housing having a forward end and a rearward end; an aperture in the container housing through which route markers located in the chamber can be dispensed from the chamber to the outside thereof; dispensing means associated with the container housing for ejecting from the chamber at predetermined intervals route markers in the container housing; and attachment means for securing the container housing to the animal.

In yet a further aspect, the invention is for a carry pack for an animal used to detect the presence of a target object by sensing a characteristic odor associated with the target object, the carry pack comprising: a container housing defining a space; transmission and receiving means within the space for effecting communication between the carry pack and a remote control source; a chamber within the space for containing route markers, the chamber further having a dispensing channel leading to the outside of the container housing and a timed release means for sequentially ejecting route markers from the chamber at predetermined intervals; a prong extending from the container housing and having an outside end outside the container housing and an inside end within the space, the prong having at its outside end activation means which can be activated by the animal; a signal processor in the space and connected to the inside end of the prong, the signal processor processing signals originating from the activation means, and being connected to the transmission and receiving means; and a substance delivery means connected to the signal processor for delivering to the animal a predetermined substance in response to the activation of the activation means. The substance delivery means may comprise drug delivery via cannula directly into the animal's brain, or by subcutaneous injection, or by inhaled or transdermal administration.

According to a still further aspect of the invention, there is provided a kit for use in the detection of a target object to be detected by an animal, the kit comprising: a receptacle having a first chamber for containing a substance having an odor associated with the target object and at least one hole through which the odor can permeate to the ambient environment, and a second chamber for containing a reward substance and having access means for providing access to the animal; and a carry pack for mounting on the animal, the carry pack having dispensing means for dispensing visible objects therefrom at predetermined intervals.

It is thus an aspect of the present invention to provide a cost-effective method and apparatus for the localization, and, if desired, neutralization of active landmines to minimize risks to the lives of trained personnel and animals. This may be achieved by using rodent rats or other suitable animals such as birds, dogs and insects to perform the most dangerous facets of landmine clearance, namely the steps of localizing and unearthing landmines.

It is a further aspect of the present invention to provide a method that is highly flexible, synergistic and complementary to other conventional methods presently employed.

Another aspect of the present invention provides a flexible implementation strategy which is cost-effective and feasible to achieve in a short period of time. The apparatus and method of the present invention can be implemented, managed and used not only by professionally trained persons but by the inhabitants of the landmine area after receiving the necessary training and technical guidance. This reduces the need for the presence of professionally trained personal in the field thus significantly reducing the operational costs.

Another aspect of the present invention is to implement a simple, low-tech, and widely accessible method for the preliminary detection of landmines in the field which exploits the existence of a common substance present in most active landmines.

Yet another aspect of the present invention is to provide a method for precisely identifying the location of landmines by using objects to mark landmine sites or using interactive electronic signaling devices, and mapping techniques.

BRIEF DESCRIPTION OF THE DRAWINGS

FIGS. 5(a) and 5(b) show two views of one embodiment of a carry pack of the invention;

FIG. 6(a) shows a top view of an electronic carry pack of the invention;

FIG. 6(b) is a top view of the electronic pack of the invention illustrated in FIG. 6(a) in the open position to show the internal contents thereof;

FIG. 7 is a perspective view of another embodiment of a dummy or regular landmine of the invention;

FIGS. 8(a) and 8(b) are perspective and side views respectively of yet another embodiment of a dummy or regular landmine of the invention; and FIG. 9 is a perspective view of yet another embodiment of a dummy or regular landmine of the invention.

DETAILED DESCRIPTION OF THE INVENTION

Figure 1A:
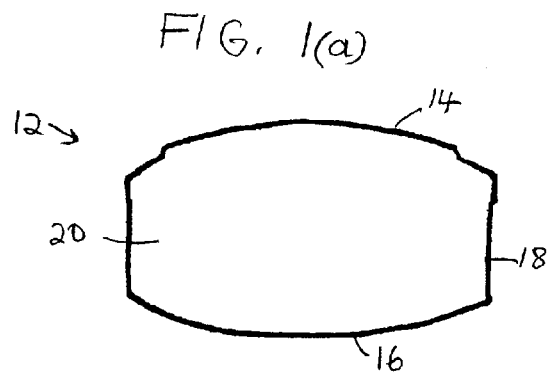
FIGS. 1(a) and 1(b) show schematically typical or conventional land mines, whose outward appearance and design the dummy landmines resemble in some ways, detonated by pressure or tripping booby trap mechanisms.

The present invention provides a method and a series of devices for deactivating landmines which includes the training of animals, such as but not limited to rodent rats and birds, to seek out and dig up target objects, such landmines, drugs, ammunition caches, earthquake victims and humans, by their own waste or that their domesticated animals, by using the faint scent characteristic of such target objects. The invention is also for the training of animals to aid in the localization of such target objects by using methods and devices capable of marking the location thereof in a number of different ways.

An important aspect of the invention is for the detection of landmines. Many of the examples herein will use the landmine scenario, but it should be appreciated that the invention is not limited to this application, and methods and devices of the invention can be used to locate and identify a large number of target objects having characteristic odors or other physical features.

Because the vast percentage of active mines use TNT (trinitrotoluene) and other explosive products containing nitrate or nitrate based compounds, this inherent characteristic found in most active landmines can be effectively exploited by using nitrate odor to implement a method having broad application to localize, unearth, and detonate active mines. Specifically, rats, or other animals with detection and training capabilities will be cross-conditioned to associate an addictive drug or a combination of various addictive drugs, which can be orally self-administered by the rat itself, with the aromatic scent of nitrates containing explosives. Such conditioning or training of rats will be achieved by providing the addictive drug, in odorless form, from an appropriate dispenser buried on the ground that resembles a landmine present in the area in question. These animals seek out the scent of the explosives with the trained determination to obtain the addictive drug or drug combinations. As they disrupt the nearby soil and partially dig up the landmine area searching for the addictive drug, they perform critical and essential steps in the process of identifying and locating landmines.

Other related methods of the invention include features that maximize greater precision in a pin-point location of the landmines (or other target object). Precise localization of buried or unearthed mines can be achieved in a number of different ways based upon the degree of dependence on technology and cost. Some of these ways include: (a) colored pellets are dropped to mark the pin-point location or exact site where the rat has spent a significant relatively long period of time unearthing a mine; (b) an electronic "signal emitting" device is attached to the rat's body or an apparatus is worn by the rats, wherein from a plotting of the rats' movements, one is able to extrapolate the precise location of the terrain where the rat has spent a disproportionate amount of time and which are possibly the active landmine sites; (c) the rat is conditioned to perform a specific behavior once a mine is localized and unearthed, such as circling the mine once or a number of times, etc., the behavior being one that would be easily interpretable on a tracking computer program because of the "tagged" tracking system employed; (d) the rats may wear a "catheter jacket" device or a small carrier pack with similar tracking functions, both having either (1) a localizable "tag" affixed to the jacket/pack (e.g. electronic signal emitting chip, or prominent coloring of the material of the jacket/pack), or (2) a traceable "tag" object which, upon discovery, the animal releases to the site where it has positively located a landmine/target. This object may be traceable by its innate visual prominence (such as a small bright red ball), or, the object may be minute in size but made of an easily trackable material (such as radio-frequency traceable chip or ball-bearing, a chip that emits a radio signal, is luminescent, or is detectable by some other specialized means employing adjunct hardware). Identification of the exact location of a mine may be achieved by a number of technical devices, which vary in sophistication and cost. Examples include satellite G.P.S. technology, infrared detection of deposited luminescent "tags" on the minefield, and minefield-specific mapping using a radio-frequency triangulation system. For use of radio-frequency triangulation, a "triangle" shaped area of the mine-field is demarcated by a wire, and each of the three corners of the triangle serve to define unique coordinates for any point on the triangular enclosed area. Then, the animal, which wears a radio-frequency "tag", is allowed to operate freely in the triangular area, and the position of every animal is a unique function of three coordinates referenced to the three points of the triangle.

Reference is now made to the various Figures. With reference to FIG. 1(a) of the drawings, there is shown, in diagrammatic outline a simulated or dummy landmine 12. The dummy landmine 12 comprises an upper surface 14, a base 16, and side walls 18. The dummy landmine 12 is generally of cylindrical shape, when viewed from above. The upper end 14, base 16 and side walls 18 define a chamber 20, adapted to contain explosive material, in the case of a real landmine, but may contain any material appropriate for training or other purposes in a dummy landmine. Furthermore, the space defined in the chamber 20 may be completely empty for training purposes.

The dummy landmine 12 may also contain other components, not specifically shown in FIG. 1(a) of the drawings. Such components may include the activating or trigger device, which is typically pressure-sensitive, and which directly or indirectly detonates explosive material adapted for storage in the chamber 20. The detonating device would typically be located at or near the upper surface 14 of the dummy landmine 12, which is commonly buried just beneath the surface of the earth, or covered with camouflage material to conceal its location.

Figure 1B:
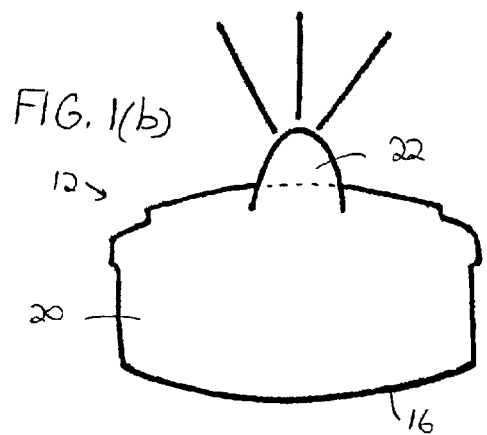

FIG. 1(b) shows, schematically, the dummy landmine 12, in most respects identical to that shown in FIG. 1(a), diagrammatically indicating a trip wire mechanism 22 for detonation of the dummy 12.

Figure 2:
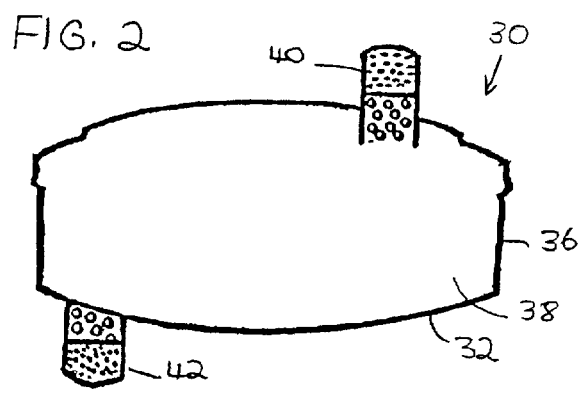
FIG. 2 shows a dummy land mine constructed in accordance with the present invention.

Reference is now made to FIG. 2 of the drawings. In FIG. 2, there is shown a dummy landmine 30, similar in shape and size to the standard dummy landmine 12 in FIGS. 1(a) and 1(b). The dummy landmine 30, constructed in accordance with the present invention, includes a base 32, upper wall 34, and cylindrical side wall 36. The base 32, upper wall 34 and cylindrical side wall 36 define a chamber 38 designed to contain, in a real landmine, an explosive material, which may typically be trinitrotoluene, or TNT. As discussed elsewhere in this specification, many explosive chemicals and materials contain nitrates or other aromatic explosive compounds, which give off a characteristic odor, and this odor is used by animals in locating a landmine (or other target object), also discussed in more detail elsewhere in this specification.

The dummy landmine 30 comprises a cylindrically shaped perforated container 40 formed in the upper wall 34, and/or a cylindrically perforated container 42, constructed in the base wall 32. Both these perforated containers 40 and 42 are substantially identical in configuration and function.

Figure 3:
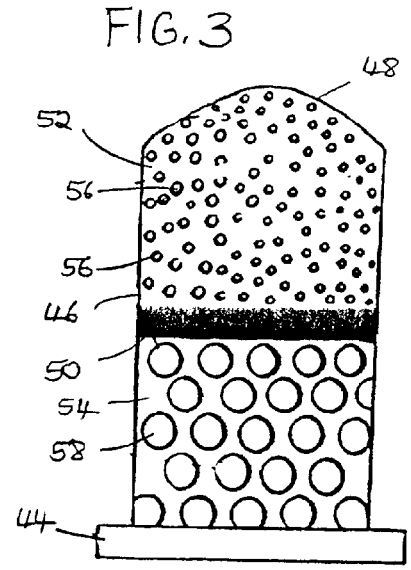
FIG. 3 shows a more detailed view of a perforated container associated with the land mine of the invention and used for dispensing the substance scent and the addictive drugs.

With reference to the perforated container 40, which is also shown in a detail in FIG. 3 of the drawings, this perforated container 40 comprises a base member 44 which, depending on the embodiment used, may either comprise a wall of the dummy landmine 30, or may be an independent base member constructed solely for the purposes of defining the perforated container 40 and/or, to allow perforated container 40 to be screwed onto the body of dummy landmine 30 by screw threading located on base member 44 for fitting onto a threaded hole in dummy landmine 30. The perforated container 40 comprises a cylindrical outer wall 46, closed at the top by a domed-shaped hood 48. A separation wall 50 is formed, in the embodiment of FIG. 3, approximately midway up the cylindrical outer wall 46, and divides the perforated container into an upper chamber 52 and a lower chamber 54. The upper chamber 52 is totally sealed from the lower chamber 54 by the separation wall 50, SO that there is no communication therebetween within the cylindrical outer wall 46 of the perforated container 40.

The cylindrical outer wall 46 in the area of the upper chamber 52 includes a plurality of small perforations 56, while the outer wall 46 defining the lower chamber 54 includes a plurality of larger perforations 58. While the embodiment shown in FIG. 3 illustrates the small perforations 56 and large perforations 58 as described, it is to be understood that the perforated container 40 may have other configurations so that perforations of any suitable size and shape, or even an absence of perforations, may be used.

The outer wall 46, based member 44, hood 48 and separation wall 50, all of which define the perforated container 40, are preferably comprised of a suitable plastics material. However, any suitable material, such as metal, fabric supported by a frame, or a combination of materials may be used in the construction of the perforated container 40.

In use, the upper chamber 52 of the perforated container 40, contains a material which gives off an odor or scent, preferably one containing nitrates or other aromatic explosive compounds if the target object is a landmine, or simulating the smell of an explosive. However, the invention is not so limited. Indeed, the upper chamber 52 can be described as one which contains the "target scent", be it one associated with an explosive, drug or family of drugs, or a particular product or object which the animal is trained to sniff out or detect. In the present example, where the perforated container 40 is one attached to a dummy landmine 30, the upper chamber 52 will, of course, tend to contain a material which is associated with explosives, and particularly the nitrates of TNT. However, in other training exercises where the perforated container 40 is not attached to a dummy landmine 30, but may be attached to any other appropriate object, the upper chamber 52 will contain a material or composition which gives off an odor associated with the target being sought by the trained animal.

The lower chamber 54 is preferably designed to contain an addictive drug, preferably an oral drug, which can be consumed by the trained animal as a programmed reward for detecting the scent or odor emanating from the upper chamber 52 into the ambient atmosphere through the small perforations 56. Likewise, the addictive drug can be consumed by the animal by inhalation through perforations in lower chamber 54. Thus, when the animal has detected the appropriate scent emanating form the upper chamber 52, the animal will be rewarded by obtaining access to the addictive drug, accessible through large perforations 58, contained in the lower chamber 54.

The design of the perforated container 40 is preferably such that the trained animal will perform some task around the perforated container, upon detecting the odor emanating form the upper chamber 52, so that the immediate surroundings of the perforated container 40 will be disturbed in the trained animal's efforts to obtain the reward of the addictive drug contained in the lower chamber 54. This disturbance of the surrounding area will alert subsequent detectors of the landmine that the trained animal was active in the particular disturbed area, a signal of a potential landmine. Additionally, and as described elsewhere in this specification, the need to spend more time at the perforated container in order to access the addictive drug in the lower chamber may also result in the deposit, by the trained animal, of pellets or other small objects, dispensed at a given rate, so that the number of these small objects will also serve as a telltale sign of the animal's prolonged stay at the specific site and that the trained animal may well have detected the target scent. Additionally, or alternatively, the trained animal may be wearing some form of signal emitter, also described elsewhere in this application, and such signals may be received and appropriately processed to alert landmine detectives that the specific site where the trained animal spent more time is a potential landmine location.

Figure 4A:
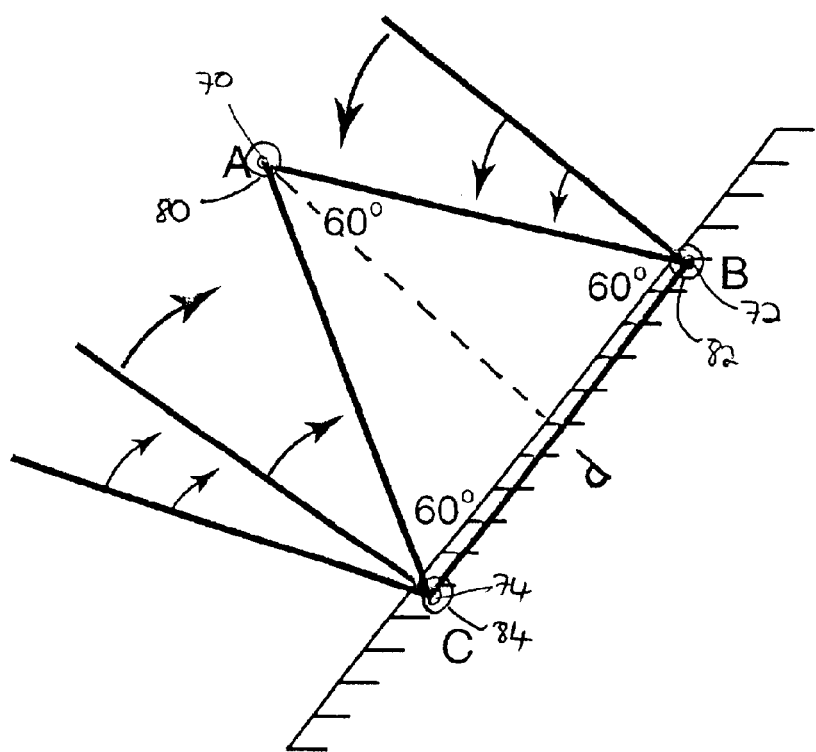
FIGS. 4(a) and 4(b) illustrate diagrammatically mobile triangular enclosures configured in accordance with the present invention.
Figure 4B:
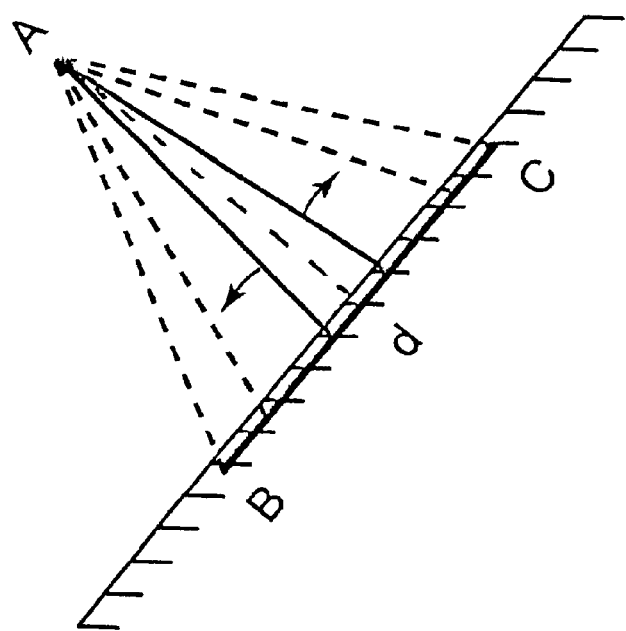

Reference is now made to FIG. 4(a) of the drawings, which schematically illustrates a "mobile triangular enclosure", constituting an area which may be searched using trained animals carrying signal transmitters in association with signal receivers to detect the position of the trained animal. It should be understood that, while the particular embodiment shown in FIG. 4 shows a triangular enclosure, the invention is certainly not limited to enclosures of this shape. Any other shape area, such as square, rectangular and the like may be used. Indeed, the area under scrutiny comprising the mobile enclosure may be determined by the nature of the terrain and natural objects or structures which define a particular area. Therefore, the use of a triangle shown as the embodiment in FIG. 4 is for representational purposes only, and the invention is not confined to this shape.

In FIG. 4, three posts 70, 72 and 74 are located on the ground, the three posts 70, 72 and 74 defining, in the embodiment shown in FIG. 4, a triangle 76 which constitutes a search space 78. Each post 70, 72 and 74 has mounted thereon at least one antenna and/or associated electronic equipment. Thus, post 70 carries antenna 80, post 72 carries antenna 82, and post 74 carries antenna 84.

The trained animals, preferably rats, are released into the search space 78 with each animal carrying on its body appropriate equipment, as will be described below, which transmits signals, for example, at predetermined intervals. These signals are received and processed by the antennae 80, 82 and 84, and relayed to computer equipment which receives the signals, and is able to plot the position of the animal within the search space 78. Since the animal is wearing equipment which emits signals at predetermined intervals, the processing equipment receiving the signals from the antennae can be read to determine whether the animal is moving about within the search space 78, or is stationary or substantially stationary at a given point therein. Clearly, when an animal has become relatively stationary, as determined by the signals emitted and processed, this suggests a strong likelihood that the animal has detected the target odor, thus providing the users of the system with pertinent information relating to the possible position of a landmine.

The triangulation apparatus is designed to be easy to set up on the minefield. The "posts" described herein refer to the three (or more) corners of the enclosure that will be set up on the minefield for purposes of both defining the area to be searched, as well as to pen the animals within that area during their search. While the details concerning what materials and procedure is used to define the enclosed area can vary, two different methods and materials are as follows:

1. Wooden or plastic boards of pre-measured length, width, and height, are laid onto the field from the safety of the minefield "sideline" (line demarcating safe ground from un-cleared minefield) and the distal ends of these boards are joined in an apex, forming a triangle. The boards are of sufficient height so as to prevent the rats from jumping over them and escaping. Alternatively or in addition, the rats can be conditioned to not jump over or otherwise cross these confines. To facilitate the operator's safe access to as much of the triangle as possible, two corners of the resulting triangle lie a short distance on "safe ground" side of the sideline (FIG. 4, B and C). The third corner (FIG. 4, A.) lies deep in the minefield. Each corner of the triangle contains a radio-frequency receiver/transmitter, such that the space enclosed by the triangle is completely surrounded by the three or more radio-frequency receiver/transmitter units. The rats are led into the search field (interior of the triangular space) from some point along the safe sideline (FIG. 4, line BC).

2. These are weights to which are attached a minimum of two items: i. a radio-frequency receiver/transmitter unit (as above), and ii. one or two wire/string elements that serve to "pen" the rats within the interior of triangle (i.e. "search space" XX in FIG. 4(b)). Post A, which will be thrown onto the search field, has two wire/string elements attached to it, while one single wire/string element will connect Post B to C. The triangle must be laid out on the field in such a way that minimizes risk to the operator. Therefore, with the operator remaining on the "safe" side of line (FIG. 4, line BC) just outside of the interior of the triangle, posts B and C can be laid short distance into the safe zone demarcated by line BC. From the mid-point of the safe sideline (line BC), the operator throws post A onto the minefield, a distance d. from post A. As described, each "post" is comprised of a weight to which are attached an antenna/associated electronic equipment, and two wire or string elements. Also, these wire/string elements must connect all three posts. Therefore, the two wire/string elements of post A are connected to posts B and C. Wire/string elements AB and AC are coiled around post A. The operator must hold onto the ends of the wire/string elements of post A as he/she throws post A onto the field. After post A lands on the minefield a few meters distance from the operator, he/she will take wire/string element AB and attach it to post B, and wire/string element AC and attach it to post C. In this way, a triangular enclosure is laid on the minefield in a way that does not require the operator to ever step foot on the minefield. Again, this triangular enclosure has the following essential features: 1. All three corners attached to a radio-frequency receiver/transmitter unit, and 2. All three corners are connected by a wire/string element so as to enclose the animals within the "search space". The entire search field enclosed by the wire/string elements is completely surrounded by the three radio-frequency receiver/transmitter units located at posts A, B, and C. The animal on the search field wears an electronic "tag" that is detected by the three antennas of the triangle. The exact location of the animal, as a function of distance from posts A, B and C, is relayed to the operator on the sideline by a "receiver unit" that informs he/she of the exact location of the animal at all times.

Alternatively, instead of "tag" that continuously registers the animal's exact location, the animal can wear a "tag" which the animal itself activates to emit a signal informing the operator of the exact location of a target (e.g. landmine). The animal activates such a signal by biting or otherwise disturbing some attached feature of its backpack or harness (e.g. "pronged element").

In order to obtain more accurate and precise results as to the position of an animal within the search space 78, a particular post may have more than one antenna, at different heights or positions thereon, so that all of the variety of signals being transmitted back to the processing computer can determine with greater precision the position and movements of the animal.

Reference is now made to FIG. 5 of the drawings, which shows a carry pack configured and designed for attachment to a trained animal, such as a rat. FIG. 5(a) shows a schematic illustration of the carry pack 100 of the invention, while FIG. 5(b) shows a rear end view of the carry pack 100.

The carry pack 100 comprises a container housing 102 having a forward end 104 and a rear end 106. The container housing 102 is typically shaped according to the animal on which it will be mounted, but generally, in a preferred embodiment, would be a somewhat flat, elongate structure. The container housing 102 defines a chamber 118 which, amongst other things, is adapted to contain a plurality of small pellets or objects, which may be brightly colored or otherwise configured so as to be easily detectable. The rear end 106 of the container housing 102 has an opening 112 through which the pellets or objects 110 are discharged or released.

The opening 112 may be filled by a funnel opening or small tube 114 through which the pellets 110 are conveyed when being discharged from the chamber 108 to the outside of the carry pack 100.

The carry pack 100 further comprises a pair of front shoulder straps 116 and 118 which are sized and shaped so as to securely fit the animal. The carry pack 100 also includes a rear abdominal strap 120 which, in practice, in fastened around the abdomen of the animal. Preferably, the front shoulder straps 116 and 118, as well as the rear abdominal strap 120, may be adjustable in length so that the mounting of the carry pack 100 on the animal can be customized according to the size of the animal.

With reference to FIG. 6 of the drawings, another embodiment of the invention is shown. FIG. 6(a) shows a top view of a carry pack 130, while FIG. 6(b) shows a schematic representation of the contents of the carry pack shown in FIG. 6(a) of the drawings.

FIG. 6(a) shows a carry pack 130, comprising a substantially flat, rectangular housing 132, having a base 134 and a cover plate 136, the base 134 and cover plate 136 together defining a space 138 therebetween. The cover plate 136 includes a prong aperture 140 and a cannula aperture 142. An antenna 144 is mounted on the cover plate 136, and is connected to the appropriate electronic components within the space 138, to be described, so that effective electronic communication can take place between the carry pack 130 and appropriately located signal transmitters and receivers for conveying information between the carry pack 102 and an operator and/or computer (not shown).

Referring to specifically to FIG. 6(b) of the drawings, the preferred contents, according to one embodiment, of the carry pack 130, is schematically illustrated. The space 138 comprises a receptacle 148 adapted to receive a plurality of pellets, not shown. The receptacle 148 may also comprise a digital clock with associated release mechanism 150, by means of which pellets are released from the receptacle 148 to the outside through a channel 152. As described elsewhere, the clustering or concentration of such pellets in a particular spot is an indicator to operators of the possible existence of a landmine.

The space 138 also comprises a transmitter and signal-maker 154 which produces and transmits signals from the carry pack 130 to appropriate receiving antennae or other forms of receivers. The transmitter and signal-maker 154 is in contact with the antennae 144, extending outside of the carry pack 130. Also within the space 138 is a receiving and transmission processor 156, which is electrically connected with the transmitter and signal-maker 154. The receiving and transmission processor 156 is able to process various radio frequency signals from the transmitter and signal-maker 154, as well as to process signals which may be received from a remote source. The "receiving and transmission processor" has a dual purpose: 1. To act as a "transmitter", and in this way a.) register the exact location of the animal either at all times on the operator's receiving display device, or, b.) transmit a specific "signal" whenever the animal activates some component of the carry pack, which defines a specific position where a target can be found. The "receiving" element of the carry pack is designed to allow the operator to control various and optional electronic features of the carry pack, such as lights, signal emitters, pellet dropper, drug release to the animal via subcutaneous injection (by the carry pack) or via brain cannula to the animal's brain, remote euthanization of the animal, a specific cue sound transmitted on an optional speaker on the carry pack, etc. In fact, an operator directed release of "tag" pellets can be achieved through the "receiver/transmitter" function of the pack, whereby a "tag" is released only when the operator activates release, when he/she thinks that the animal's behavior indicates that it has found a target. Likewise, a computer at the operator's device-display control center can detect automatically when the animal has indicated a likely find (excess time in one area, a unique learned action by the animal designed to indicate when it has found something, such as a circle around the target, etc), and automatically signal to the carry pack to release a "tag" so that the area presumably containing the target can be carefully inspected at a later date.

The carry pack 130 further comprises a drug container 160, also operatively connected to the receiving and transmission processor 156, the drug container 160 having extending therefrom a small flexible tube 162 at the end of which is mounted a cannula 164 which may be implanted subcutaneously within the head of the animal, to drain directly into its brain and/or vascular system. The flexible tube 162 preferably comprises or contains three separate smaller tubes, connected to the drug container 160, each of the smaller tubes being capable of administering a substance, as will be described.

The drug container 160 may preferably comprise three vials or containers, shown in phantom lines in FIG. 6(b), each vial containing a separate chemical. Typically, these three chemicals would be an addictive drug, a noxious substance, and a signal chemical. The three smaller tubes within the flexible tube 162 are each designed to transmit one of the substances within the drug container 160, upon appropriate activation to the animal. The drug container 160 may include a pump 166, shown only schematically in FIG. 6(b), by means of which the appropriate chemical is forced through the tube 162 to the animal.

The carry pack 130 further comprises a rigid tube 170, extending outwardly from the space 138, and connected to a processor 172 located inside the space 138. The processor 172 communicates with the receiving and transmission processor 156. The rigid tube has along its length, and outside of the space 138, a small light 174, which is preferably a small LED yellow light preferably positioned so that it falls within the peripheral view of the animal when the carry pack 130 is mounted on the animal. The rigid tube 170 terminates in a prong 176. The precise operation and function of the prong 176 is described elsewhere, but, briefly, the prong 176 can be bitten or gnawed, or otherwise activated by the animal. The prong 176, as well as the illumination of the light 174, may be used to guide the animal through the landmine detection process by eliciting pre-trained and programmed responses, as discussed elsewhere herein.

FIG. 7 of the drawings shows a dummy landmine configured differently from that previously illustrated, and constitutes another embodiment of the invention. FIG. 7 shows a landmine 190 having a compartment 192 for containing a target scent source, such as a nitrate or other aromatic components of the target, covered with a perforated cover 194 through which the odor or scent can permeate. The landmine 190 further comprises a reward content compartment 196, which may contain items such as pellets of an odorless, addictive drug, a food stuff, or a combination thereof. The reward compartment 196 is sealed with a perforated cover 198, the animal being able to access the contents thereof through the perforations in the cover 198. The various components can be screwed on to the landmine 190, and the feature of interchangeable parts of the dummy land mines serves to make their use cheaper and easier.

In FIGS. 8(a) and 8(b) of the drawings, another landmine 202 is illustrated. FIG. 8(a) shows a perspective view of the landmine 202, while FIG. 8(b) shows the side view thereof. On the upper end of the landmine 202 is the scent source container 204, having a perforated cover, while at the lower portion, or undersurface thereof, there is the reward container 208 sealed off by the perforated cover 210. The operation and function of the various compartments in the landmine 202 is essentially the same as that shown in FIG. 7, except that the animal is required to dig around and under the landmine 202 in order to secure its reward.

FIG. 9 shows another embodiment of a landmine 212 having the scent containing compartment 214, sealed with cover plate 216 on the side wall 218 thereof, while the reward compartment 220, having perforated cover 222, is also on the side wall 218, and must be accessed by the animal.

A landmine of the type illustrated in FIG. 7 may be used, for example, where a rat is to be conditioned to localize, but not completely unearth the landmine, and not to dig the mine out and flip it over in search of addictive drug pellets. Further, as an additional embodiment, the landmine shown in FIG. 7 may contain a switch which, when the landmine is flipped over, causes delivery of a noxious stimulus, such as a shock or contamination of the drug pellet with a bitter liquid or bitter taste to condition the animal from digging up the landmine.

The landmine shown in FIGS. 8 and 9 of the drawings can be used where it is favorable or desirable to condition the animal to fully or partially dig out the landmine, since the earth or surrounding structures must be displaced and removed by the animal before it can access the reward compartment.

Examples of Methods and Device of Invention

Some of the more important steps of the processes and of the devices of one embodiment of the present invention are described in more detail below.
Step 1
Laboratory training of rats, in the setting of landmine detection, requires the development of a cross-conditioned response to two separate stimuli: 1) powerful drug cravings (unconditioned stimulus) for the drug that the animal has been made addicted to, and 2) the scent of the specific target (conditioned stimulus) that the animal is being conditioned to seek. The result is that the animal learns to directly associate relief of its drug cravings with its ability to locate the target scent (the conditioned response). After such cross-conditioning, the animal seeks the target scent (TNT nitrate vapors or other similarly aromatic explosive compounds) with drive and determination fueled by its addiction to the drug (nicotine, methamphetamine, or similar substances) it associates with the target scent. Particularly, the specific training process of the animals would include male adults rats being trained to become addicted to an odorless, minimal-taste, highly addictive drug, which would be administered to rats only in the presence of nitrate containing vapors of similar quality and concentration as those which dogs may be trained to detect, follow, and locate and which resemble landmine odors.

Essentially, the rats brains are conditioned to associate the olfactory detection of "bomb-related nitrates" with the substance that when eaten (or otherwise self administered) will satisfy of their addiction cravings. To achieve this, the highly addictive substance is first introduced to the rats (in the lab setting) coupled with food and the target scent. For example, the animals feeding receptacle can be outfitted with a small perforated container which contains the target scent. The food is mixed with or is made solely of the odorless addictive drug. After a few sessions with food, drug, and target scent all coupled together, the animal is presented with the same foodstuff minus the drug, or, the presence of the scent. Then, the animal is re-presented with all three components again. In this way, it learns to associate the drug with the scent, and not anything else. After a few sessions, the animal can be presented with two food vessels, A and B, each fitted with an identical-appearing perforated container, located close to where the animal stands to feed. Vessel A's perforated container contains the target scent, and Vessel B is empty. The food in Vessel A contains the odorless drug (pellet, liquid, etc), while the food in Vessel B is free of drug. The animal has been successfully cross conditioned to the drug/target scent when it feeds only, and always, from the scent/drug containing vessel (Vessel A), without ever having to sample the food in the drug-free Vessel B. In this way, the rats drive to locate the target scent is equated to and reflects its drive to satisfy its drug cravings. Alternately, the development of the rats could be coupled with manipulation of certain genetic traits, and the training of the animals could be enhanced by genetic engineering. In other words, once certain animal behaviors can be isolated and studied, the development of rats which are genetically more suited to tolerate the presence of nitrates, or have some predisposition to addiction to nitrate substances, could be used in conjunction with the training of rats for the purpose in question.
Step 2

The rats gradually learn to seek out landmines in a controlled laboratory environment and then in the field within special triangular mobile enclosures (see FIG. 4) by using their olfactory sense and drug induced drive as motivation. Knowing the exact area which has been cleared can be accomplished by setting up a triangular shaped map. The boundaries of such areas are simple to create. Therefore, rats are released into a triangular enclosed space and begin seeking dummy landmines using scent, sight and/or feel.
Step 3

Once the rats locate a landmine (based on the detected odor of nitrate vapors or other explosive compounds), they will search for the addictive drug that they have come to associate with finding an object that looks like a landmine, and which possesses the characteristic target smell (e.g.

nitrates). In the controlled training setting, the rats would have been led to the location of the buried (or hidden) dummy landmine based on the target scent emanating from the scent containing perforated container (FIG. 8: 204, 206; FIG. 7: 192,194; FIG. 9: 214,216). This perforated container, located on top of the dummy landmine, on its underside, or on the side (see FIGS. 2, 3, 7, 8 and 9) can be packed with a piece of cotton impregnated with the target scent chemicals (or material). In the controlled setting, the rats will be conditioned to expect the drug containing perforated containers to reside either anywhere on the body of the dummy landmine (resulting in an aggressive search each time), or, always on top (leading the rat to only unearth the top aspect of the mine) etc. In other words, the rat will perform a physical search of the mine it finds that mimics the extent and "aggressiveness" of they way it was conditioned to search the dummy landmines in the controlled training setting. If the operator wants the rat to totally unearth the (real) mines it finds, it will accustom the rat to expect the drug containing perforated container to be literally anywhere. If he/she wants the rat to tread lightly on or near the mine, he will locate the drugs always in the same spot, use negative conditioning, and/or offer the rat a means of receiving its reward without disturbing the mine site.

The idea is that the animal first finds the dummy land mine based on the scent from the perforated container. Therefore, if the animal is digging at the mine, it has already detected the target scent. Anything it does to the mine thereafter is based on its search for drug. Step 2 after finding the dummy landmine, is inspecting it closely for the drug.
Step 4

While searching for the landmines and the addictive substances, the rats are capable of sufficiently disturbing the landmine's specific site or location in the surrounding soil and dirt. This disturbance makes the location of the landmine more conspicuous and identifiable for human clearers, which in turn makes clearance much safer for later deactivation and/or removal by a person, with or without the aid of a dog. Thus, for example, when the ground or soil around the landmines have been disturbed after a certain amount of time at night (x hours), the rats are called back to their container, possibly using addictive drug rewards. The rats may learn that three short blasts from an ultrasonic horn is a signal for them to return to their home field cages. Consequently, real landmines have now become visually easier for dogs and humans to detect, clear, and remove.
Step 5

Once the rats have spent a sufficient amount of time searching for and "digging up" landmines, they can be summoned back to their transport cages by a signal of a subsonic horn device to which the rats have been trained to respond positively. This "recall" method is made more certain because rats are trained to receive the immediate rewards of food mixed with the addictive drug when they respond to the subsonic horn device used.
Step 6

In some circumstances, the rats activity may detonate the landmines. Because the rats search only within a confined area (the triangular enclosure; see FIG. 4) and are not accompanied by humans or trained dogs, occasional detonation of landmines during this process will not cost any human lives or cause the loss of trained dogs. In some cases, detonation may indeed be the desired outcome, wherein the training can be modified to condition and train the rats to manipulate the sensory device of small landmine simulators in the laboratory. Thus, in creating the expectation of receiving the addictive drug/food mixture, the rats can be trained to disturb the sensory devices in the laboratory sufficiently to cause detonation of a real landmine in the field. Likewise, in the laboratory setting the rats can be exposed to the intricacies of specific booby-trap mechanism designs which the rats are believed to likely encounter. The rats can in this way be conditioned to optimally detonate, or avoid detonation, by these booby-trap mechanisms.

Step 7

Use of various devices and methods can enhance the above methods, when used alone or in combination therewith. The methods which can be used to achieve a precise localization and identification of the dummy landmines, or real landmines may include the use of devices, examples of which are described below.

Example 1

A small rectangular plastic container may be attached to the rats' back as if it were a carry pack) (see FIGS. 5(a) and 5(b)). A carry pack can consist of a small light plastic/rubber container having an elliptical shape which is fastened to the rats' back using a small harness of plastic or heavy cloth. The carry pack can house a small battery and machine that dispenses small pellets through a rear opening at regular set time intervals. These pellets can be of bright color and may also fluoresce under ultraviolet light and possess a very distinctive odor to aid in their localization by sight and/or smell the next day after the rats have been removed.

Specifically, the carry pack can be a small rectangular plastic box containing a number of small colored pellets (about 6 mm in diameter) which releases colored pellets, one at a time, every predetermined amount of seconds. Consequently, the area where the rat spends most of its time "searching" for a landmine will have a disproportionally large number of colored pellets compared to areas where no landmine is found because the rats will spend more time digging up a suspect landmine in an area which actually contains the landmine. Clustered droppings of these pellets will be found in an active area with landmines, and human clearers will be able to subjectively judge and ascertain, depending on different characteristics such as type of the terrain and other variables, whether an area harbors active landmines. The trainer's ability to predict the performance of the rats can be strengthened by placing the rats in a field location where the dummy landmines contain two or more perforated containers on its surface, thereby making the rats spend more time around these additive-reinforced landmines so that a trainer may know whether the rats will perform basically in the same way in a field with real landmines. This approach may be very beneficial and well-suited for use by indigenous villagers because there is no great need for highly skilled personnel and local young rats and inexpensive drugs such as nicotine, amphetamine or narcotics may be used.

Example 2

A carry pack containing a small transmitter which emits an individually numbered signal every X number of seconds, which in turn, is detected by three equidistantly placed antennae (mounted on posts, as previously described) so that the signal is triangulated, analyzed and then plotted on a computer screen that is scaled to the area and shape of the specific enclosure. With this method and apparatus, mine clearing personnel have more information, such as the number and the likely locations of suspect landmines. When they approach these areas alone or with their dogs, there is a greater margin of safety, effectiveness and efficiency. More discrete units of land can be safely cleared in less time and at less overall cost. This type of objective proficiency testing may help develop a high rate of accuracy relative to normal data from conventional landmine removal training programs.

More specifically, this variation consists of another type of carry pack containing a small battery powered FM transmitter designed to send a certain signal every x number of seconds. Three simple antennae, each located at a defined place, e.g., at the three angles of an isosceles triangle formed by the triangular enclosure, can receive the signal. As the signals are received, the data is analyzed by a simple triangulation program to determine the exact location of the rat relative to the parameters of the triangular area enclosed and then graphed based on the frequency of the signals. As each rat spends more time at one particular location, more signals will mark that location which can be readily identified by the PC graphing program. This method allows very accurate identifications of locations.

Example 3

A carry pack contains a small semi-flexible arm which protrudes anteriorly from the left side of the rat's head, into its field of vision. At the end of this arm is a two-armed Y-shaped prong, as shown. The prong at the end of the arm lies within reach of the rat's jaws. On the tip of the outer prong-arm is a small LED light. The entire part of the inner prong-arm serves as a biting surface for the rat. When the rat bites on the inner prong-arm, a signal is emitted from the rat's carry pack that accomplishes two things: (1) Registers the rat's exact location coordinates to the operator' electronic tracking field-display apparatus, and (2) Activates the release of a drug reward from the carry pack after the animal has performed the desired task (finding a mine, and/or digging it up and/or detonating the mine). The reward may be administered to the animal via either microinjection through a cannula that lies implanted in the animal's brain, by microinjection into the subcutaneous tissue or vascular system of the animal, or, by release of an edible drug pellet directly from the carry-pack onto the ground in plain view of the rat. The LED light at the end of the outer prong-arm is otherwise always "on" in real mine-clearance. It may be wired to blink for a few seconds as the drug reward is administered. Afterwards, it goes back to the "on" state and the animal knows to resume searching for more mines. Only during training exercises is the LED light ever turned off, and, at such times, it is turned off in order to test the animal's behavior, as described below.

The light and biting-surface of this Y-shaped prong offer a way for the rat to indicate to the operator that it has located a mine. Furthermore, the light serves to focus the animal's senses into a state of heightened vigilance. For example, in the laboratory/training setting, the animal is conditioned to expect a drug reward only when all three of the following criteria are met: 1. the target scent has been localized by the animal; 2. the animal bites the signal emitting prong-arm, and 3. (1) and (2) only when the light on the outer prong-arm is "on". If the animal bites the inner prong-arm when the LED light is not on, or in the absence of target scent (i.e. a false positive), it receives a noxious stimulus. The noxious stimulus can be delivered in a variety of ways (including the very same means by which the drug reward can be administered, as described above), but the simplest way is to deliver a small shock to the animal via its carry pack. Because such aversive conditioning would only ever occur in a controlled training setting, it is easiest to administer the aversive stimulus in the simplest, most efficient way, at all times. The aversive shock can be activated by remote control from either the operator, or, triggered automatically by dummy landmines that do not contain target scent, or which possess a characteristic that the animal must learn to avoid. The light serves to alert the animal as to when it must be on heightened alert and maximally vigilant in the field. Again, for purposes of testing the animal, the light will occasionally be presented to the animal in the "off" state, but in any real mine-clearance efforts, it will always be "on".

In the laboratory, some perforated containers will not contain the target scent, and if the rat should bite upon his Y-shaped prong when it finds such dummy landmines, it will receive a noxious stimulus. In this way, only when it discovers target scent, in combination with the prong light in "on" mode, will the rat receive a reward. The LED light serves to both focus the animal and to make the information it communicates to the operator more reliable.

Furthermore, use of the LED light facilitates use of other animals in other detection scenarios. For example, if a bird were fitted with such a prong arm, the operator could better direct when (and where) the bird should report finding the specified target. For example, a large soaring bird such as a hawk could be used to identify illegal border crossers in remote (and dangerous) desert terrain. To do so, however, the bird must know when to "start looking" for people. If it begins looking for its target the moment it is released, the result will be that multiple "false positive" sightings will be recorded. However, if the bird knows not to begin searching for its target until the light on its prong-arm is "on", then the challenge becomes simply to turn the light "on" at the right time. This can be accomplished by remote radio-signal sensors/transmitters located in the correct "search field". When the bird enters the desired search field, the sensor/transmitter units automatically "activate" the prong-arm LED light, and the bird knows to commence "search mode".

This type of training can be achieved because the rats are taught in the laboratory and in the field that, unless the LED light is "on", in the presence of a target scent, biting the inner prong-arm will yield an aversive stimulus. Thus, in the real setting, the rat signals the operator by biting the inner prong-arm only when it has located the target. The type of carry-pack and method described herein may be appropriate for dense urban areas and for use by military personnel to clear not only landmines, but also unexploded ordnance. Likewise, military and/or other security or law enforcement entities may use this method for locating caches of hidden weapons across enemy lines, or for locating caches of hidden narcotics. It should be noted that while in many scenarios, such as locating hidden landmines or ordnance, it is of paramount importance to know the exact location of the target, there are also scenarios where it is useful to know simply if the target exists anywhere at all within the search field. To determine the mere presence or absence of the target can be very useful, as it may allow the operator to better and more efficiently manage search efforts. Example scenarios for the latter include situations where large ships and/or their cargo must be searched for the presence of drugs or other hidden contraband cargo, or when searching for the presence (or signs of) of people (e.g. victims or enemy soldiers) in remote inaccessible terrain, such as in caves, in canyons, or among ruins. In short, such a method and associated devices lend themselves for determining either the mere presence of, and even the location of, the proverbial needle in a haystack.

The carry pack which is used in this method as well as the other methods described above has a small elliptical shape about ¾ of an inch thick, and weighs about 30–50 grams. It is worn on the rats' back with the aid of shoulder straps, and appears like a miniature knapsack. For one of the methods described herein, the underside of the pack houses a flexible small tube that leads from the carry-pack to a subcutaneous hypodermic needle or an indwelling intracranial cannula. The tube itself can be connected to the carry-pack by one or more smaller tubes, such that one or more different drug agents can be delivered, in any sequence, through the tube, into the rat. From the front-left side of the carry pack, a small semi-rigid arm extends forward. This arm, with a Y-shaped prong end, as described previously, extends forward to lie near the rats mouth. From the tip of the outer-most prong arm a small LED light can be made visible. The other (innermost) prong-arm serves as a biting surface inside which is a wire element that connects to the interior of the carry pack. The rat can bite onto this biting surface with its jaws and thus activate components of the carry pack. Within the carry pack, the following components may be found:

(1) a small transmitter and receiver capable of dependable short distance.

(2) a device that can be controlled by certain reception signals to cause an attached mini-pump to inject one or a combination of one or more drug substances thought the tubes.

(3) a storage device that can be controlled by certain reception signals from a remote operator, or, directly from the Y-pronged biting surface, and which contains drug reward pellets. Activation of the motorized storage device causes the reward pellet to be released through a small opening on the storage device onto the ground in plain view of the rat.

(4) a device that, in response to certain signals can cause the small yellow LED light to turn off or on or flicker, and (4) another electronic device that constantly or only upon activation by the Y-shaped prong biting surface emits a tracking FM signal to determine the exact location of the rat at any given time (see FIGS. 6(a) and 6(b)).

Furthermore, it is important that the carry-pack offers a variety of ways for the operator to determine the location of the animal at all times, and or the exact location of a target as indicated by the animal through activation of the prong-arm and attached carrier pack. It is also important to emphasize how all necessary signaling interaction to/from the animal's carrier-pack can be fully automated. Commands can be relayed to and from the carry-pack by a remote computer which is either fully automated and "pre-programmed", or, managed directly by the operator. A benefit of such automation is that the part of the mine-clearance process that uses the aforementioned method and devices can be accomplished with a minimal staff, and by non-professionals.

The above described steps exploit not only the rats' sense of smell, but their ability to sense form and shapes of objects, i.e., their abilities to discern different tactile stimuli. Importantly, this method could be used with other types of animals, such as bird, bats, etc. Other related applications possible with this method could include the identification and location of hidden caches of illicit addictive drugs hidden in the holds of ship among large crates of fruit, for instance.

While one important application of the invention described herein related to the detection and localization of landmines, the invention is not confined thereto. Indeed, using the principles of the invention, trained animals, as described herein, can be used for the purposes of localizing a significant variety of other types of material and/or substances. The importance of the invention lies in the isolation or identification of a "signature" novel scent which may be given off by the material or substance whose presence is to be detected, so that the animal can be programmed and trained to recognize that signature, novel scent so as to detect the presence of a material or substance which may be easily hidden or not clearly visible. It is particularly useful to use trained animals to detect the target material or substance by using the signature scent in situations which makes it dangerous, inhospitable, or otherwise extremely difficult for humans to carry out the search.

One example of a material or substance which can be detected in accordance with the principles of the present invention is the location of ordnance, which may be behind enemy lines. The trained animal, typically a rodent, can be used to localize and mark the location of the ordnance using the various methods and equipment which are described in this application. In this regard, the method of pinpointing the location of the ordnance can be used to advantage in a military effort to neutralize such materials. This may be achieved by the trained animal dropping a pellet or other object at the site of the ordinance, which can be used to guide weapons or troops to the site of enemy caches.

Other materials or substances which can be targets of detection in accordance with the present invention are various forms of biological warfare materials, such as bacteria, pathogens and the like.

In some instances, certain materials may be associated with a given target. Such materials may also possess a novel scent which the animal can be programmed and trained to recognize. In this way, detection of the materials with which the target is associated would, in many instances, be sufficient to localize the target itself. An example of such a situation is the use of stabilizing compounds often associated with TNT. These stabilizing compounds are not themselves TNT, or even explosive materials, but their regular association with real explosives renders them acceptable as a substitute in the search by a trained animal in searching for the target object itself.

Another example of materials associated with a target device or composition may be the scent of agar contained in petri dishes. Petri dishes may often be associated with the production and storage of certain biological warfare bacterial pathogens, and the ability of the trained animal to recognize and sniff out this particular scent would lead to the identification and localization of any bacterial pathogens growing on the agar in the petri dish.

The methods and apparatus of the invention may also be used effectively in localizing earthquake victims, living or dead, or others lost within rubble in a terrain that is difficult to access conventionally. Moreover, the localization of human victims may also extend to delivery of small items to trapped victims.

Other uses for the methods and apparatus of the invention include the detection of drugs, whether legal or illegal, that may be hidden or disguised as part of normal cargo in ships, warehouses, containers and the like. Further, animals may be trained to localize, based on odor, human urine, feces and the like which may be of assistance in determining the presence and position of, for example, soldiers behind enemy lines.

As will be appreciated from the discussion above, the specific device for training an animal will be a dummy landmine where the animal is being trained to locate real landmines. However, the device may take on a significant number of different forms, shapes and contexts, which will be dictated by the task to be performed. However, the devices which will be used for training can typically be considered to have three essential features. First, it is important that they resemble in some general, specific or functional manner the "real" target device which is being sought after in any particular operation.

Second, the device should preferably couple the particular scent of the target with the delivery of the reward. In other words, the device will incorporate both a component for giving off, or containing a composition which gives off, the novel scent associated with the target, as well as another component which includes the reward to the trained animal.

A third essential feature, related to the second noted above, is that the device serve as a container for both the particular scent, as well as the reward, which may be a relatively odorless drug reward. This drug can be mixed with an edible food, or presented alone in the form of a pellet, liquid, inhaled vapor, or suspended in a gel, solid or liquid.

The addictive drug which constitutes the reward for the trained animal may be dispensed from a plastic container, which itself may be entirely or partially edible. It is conceivable that the reward drug may be dissolved in a liquid, and such liquid can be dispensed from an appropriate valve, such as a ball bearing/spigot arrangement, where the liquid can be dispensed when the landmine or other device which has been localized and has been upturned and lies upside down.

Access to the drug reward may also be through a spring-loaded lever or window opened by the trained animal to cause the release of the drug.

The various components of the invention including the dummy target device, such as a landmine, as well as the back or carry packs described above, the transmitters described above, and other electronic parts, may be incorporated into a kit and sold as a unit. Such kits may be compiled according to the nature of the operation to be undertaken, so that there are a multitude of different types of kits, each kit having specific parts and components which are optimally designed for detecting a specific target device.

The methods of conditioning the animal may follow conventional techniques, customized and designed to enable the animal to locate a particular odor.

Once the landmine or other target has been detected and localized by the trained animal, various techniques may be used by the operator to follow up on this localization. In one form, the trained animal may have a light source on its back or carry pack which emits a pulse of light in regular fashion, such as every 30 seconds. At the same time, the area under observation may be filmed with a time-delay exposure film, so that a pinpoint concentration of light on the film would indicate the location of a landmine, or other target. The concentration of light may be in contrast to linear flashes of light, which indicate the trained animal moving throughout the field of search.

In another form, an arm with attached Y-shaped prong could be connected to a light emitting backpack, as described, so that when the animal localizes a mine or other target, the backpack emits a single-signal light pulse. This is achieved by the animal activating the prong to cause the emission of the signal. The signal light pulse serves to mark, on real time film, the location of the source of the transmission, and thus the position of the landmine.

It is not intended that the present invention be limited to the use of any or one animal or type of animal which may be trained or conditioned to recognize a target. For example, birds, dogs, rodents (other than rats) and even insects may be used for this purpose.

The novel features of the present invention provides human clearers with the most critical information: the exact location of an active mine, accomplished through the unearthing and tracking of the animal done by a marking technology system. The rats are capable of being trained to show the mine itself, including any unanticipated features such as booby traps which other animals such as dogs cannot provide. Present methods and technologies now available only provide localization to a very limited degree. Vital information concerning the location of active mines is preconceived, and mostly unknown to the clearing personnel. The method and device of the present invention provides this knowledge by exposing any otherwise visible booby trap mechanisms and wire connections to remote detonation sites, and may neutralize or detonate any booby trap mechanisms which would have otherwise exploded with simple handling/unearthing by untrained persons.

The foregoing is meant to illustrate, but not to limit the scope of the invention. Indeed, those of ordinary skill in the art can readily envision and produce further embodiments, based on the teachings herein, without undue experimentation. All changes which come within the meaning and range of the equivalence of the claims are to embraced within their scope.

What is claimed is:

1. A receptacle for use in training an animal to detect the presence of a target object, the receptacle comprising:

a housing defining a first chamber and a second chamber, wherein the first chamber in use receives a substance having a characteristic odor to be sensed by the animal and the second chamber in use receives a substance comprising a reward to the animal;

at least one hole in the first chamber through which the odor of the substance therein may pass from the first chamber to the outside of the first chamber;

access means in the second chamber so that the animal can obtain at least a portion of the substance in the second chamber;

wherein the target object is a landmine or a dummy landmine thereof and the receptacle is attached thereto.

2. A receptacle as claimed in claim 1 further comprising means for connecting the housing to the target object.

3. A receptacle as claimed in claim 1 wherein the housing is substantially cylindrical in shape, and a base is formed at one end of the housing and is secured to a dummy or the target object.

4. A receptacle as claimed in claim 1 wherein the at least one hole in the housing defining the first chamber comprises a plurality of perforations formed in the housing.

5. A receptacle as claimed in claim 1 wherein the access means in the housing defining the second chamber comprises a plurality of apertures formed in the housing through which the substance comprising the reward is dispensed to the animal.

6. A receptacle as claimed in claim 1 wherein the access means in the housing defining the second chamber comprises a plurality of apertures formed in the housing through which the substance comprising the reward is accessed by the animal.

* * * * *